United States Patent [19]

Okamoto et al.

[11] 4,348,299
[45] Sep. 7, 1982

[54] METHOD FOR PREPARING INORGANIC SULFIDES

[75] Inventors: Fumio Okamoto, Kamakura; Katsuhiro Kato, Tokyo, both of Japan

[73] Assignee: RCA Corporation, New York, N.Y.

[21] Appl. No.: 318,149

[22] Filed: Nov. 4, 1981

Related U.S. Application Data

[63] Continuation-in-part of Ser. No. 181,945, Aug. 27, 1980, abandoned.

[51] Int. Cl.$^3$ .............................................. C09K 11/465
[52] U.S. Cl. .......................... 252/301.4 S; 423/561 R; 423/565
[58] Field of Search ........................... 423/561 R, 565; 252/301.45

[56] References Cited

U.S. PATENT DOCUMENTS

| | | | |
|---|---|---|---|
| 996,094 | 6/1911 | Koegh | 423/561 R X |
| 2,485,903 | 10/1949 | Miller | 252/301.4 |
| 2,521,124 | 9/1950 | Miller | 252/301.4 |
| 3,418,246 | 12/1968 | Royce | 252/301.4 |
| 3,502,590 | 3/1970 | Royce et al. | 252/301.4 |

FOREIGN PATENT DOCUMENTS 503769  4/1939  United Kingdom .

Primary Examiner—Jack Cooper
Attorney, Agent, or Firm—E. M. Whitacre; D. H. Irlbeck; L. Greenspan

[57] ABSTRACT

Method for preparing an inorganic sulfide material including heating at temperatures between about 800° and 1200° C. a mixture comprising at least one member of the group consisting of oxidic materials of calcium, strontium and combinations thereof with a reactive sulfurizing flux which yields sulfides and polysulfides upon heating until the flux melts, reacts with the oxidic material, and the mixture forms into a molten mass. Then, cooling the mass to room temperature whereby relatively water-insoluble particles of the desired sulfide material crystallize in a relatively water-soluble matrix. The sulfide material may be separated by dissolving away the matrix in water and collecting the particles of sulfide material.

9 Claims, No Drawings

METHOD FOR PREPARING INORGANIC SULFIDES

CROSS-REFERENCES TO RELATED APPLICATIONS

This is a continuation-in-part of application Ser. No. 181,945 filed Aug. 27, 1980, now abandoned.

BACKGROUND OF THE INVENTION

This invention relates to a novel method for preparing inorganic sulfides of calcium, strontium, and combinations of calcium and strontium. The sulfides may be luminescent or nonluminescent.

It is known that phosphors in the calcium-sulfide and strontium-sulfide families have potential for use in practical applications involving photoluminescence, cathodoluminescence and electroluminescence because of the variety of emission colors and the relatively high efficiencies that are obtainable from these materials in laboratory-made devices. However, phosphors in these families are at least partially soluble in water, and their luminescence is degraded when they are exposed to water or even high humidity. Thus, these phosphors must be protected against exposure to moisture throughout the manufacture and operation of any device in which they are used.

Calcium and/or strontium sulfides are usually prepared by the sulfurization of the corresponding oxides or carbonates by heating in a hydrogen sulfide or carbon disulfide atmosphere. Also, these sulfides may be prepared by chemically reducing the corresponding sulfates with hydrogen or carbon, or by reacting the corresponding oxides or carbonates with sulfur. The sulfide products prepared by any of these methods consist of very small particles (with relatively large surface areas) that are unstable in humid atmospheres or when contacted with water.

Calcium sulfides may also be prepared by chemically reducing calcium sulfate with carbon particles in the presence of a large amount of sodium sulfate, which acts as a flux for crystallizing the product. The calcium sulfide prepared by this carbon-flux method consists of relatively larger grains and is comparatively stable in humid atmospheres or when contacted with water. However, phosphors that are prepared by this method have relatively poor luminescence efficiencies, at least partially for the reason that some residual carbon particles remain in the product after all attempts at carbon removal have been completed.

A sulfurizing-flux method has been used previously to synthesize inorganic oxysulfides; for example, by heating a mixture of an inorganic oxide with a large amount of a reactive sulfurizing flux, such as sodium thiosulfate, or sodium carbonate and sulfur. The mixture is heated until the flux melts and reacts with the inorganic oxide and the mixture forms into a molten mass. The molten mass is cooled to room temperature, and crystallized particles of the desired inorganic oxysulfide, which are water-insoluble, are recovered by dissolving away the residual hardened mass, which is water-soluble. This method, which is used to prepare water-insoluble materials, has not been suggested for use in synthesizing calcium and/or strontium sulfides for at least two reasons. First, the method is known to produce oxysulfides, not sulfides. Second, the method requires a water-washing step in order to dissolve away the residual hardened flux. Calcium and strontium sulfides, as previously prepared, are too water-soluble and too water-sensitive to tolerate the required water-washing step.

SUMMARY OF THE INVENTION

The novel method for preparing an inorganic sulfide material includes heating, at temperatures between about 800° and 1200° C., a mixture comprising (i) at least one member of the group consisting of oxidic materials of calcium, strontium and combinations thereof and (ii) a reactive sulfurizing flux which yields alkali metal sulfides and polysulfides upon heating. The flux consists essentially of (I) sulfur in elemental form, or as a sulfide of an alkali metal, or a thiosulfate of an alkali metal, and (II) at least one alkali metal as a compound thereof, said compound being a thiosulfate, or a carbonate or a hydroxide, said at least one alkali metal being a member selected from the group consisting of sodium, potassium and combinations of at least two of sodium, potassium and lithium. The heating step is continued until the flux melts, reacts with the oxidic material, and the mixture forms into a molten mass. Then, the mass is cooled to about room temperature whereby relatively water-insoluble particles of the desired sulfide material crystallize in a relatively water-soluble matrix. Then, the matrix may be dissolved away with water and the relatively water-insoluble particles of sulfide material collected. If a luminescent product is desired, a source of activator cations may be included in the mixture.

There are at least two features that are surprising about the novel method. First, it is surprising that the use of the sulfurizing flux in the novel method produces sulfides. As pointed out above, the prior use of this flux produces oxysulfides. Second, it is surprising that the novel method produces relatively water-insoluble particles of sulfide material. As pointed out above, prior methods for producing such sulfide materials produce relatively water-soluble particles. In addition, phosphors produced by the novel method exhibit relatively high luminescence efficiencies.

DETAILED DESCRIPTION OF THE PREFERRED EMBODIMENTS

Calcium sulfide, consisting of well-crystallized large particles, may be prepared by the novel method by heating a mixture of an oxidic material, such as the carbonate, oxide, or oxalate of calcium, with a reactive sulfurizing flux in a covered crucible in air at temperatures between 800° and 1200° C. for a time between 0.2 and 72 hours, depending upon the particle size desired. Calcium sulfide phosphors are obtained by including in the starting mixture a source of appropriate activator cations such as cerium, europium, or other desired activator cations. After cooling, the hardened mass is crushed to a fine powder and washed with water to recover the relatively water-insoluble crystalline particles of sulfide material and to dissolve away the relatively soluble residue. The recovered calcium sulfide is dried after being rinsed with an organic solvent, such as ethyl alcohol. Strontium sulfide and its solid solutions with calcium sulfide can also be prepared by the novel method using carbonate, oxide, or oxalate of strontium. Because the strontium sulfide product is more easily attacked by water than the calcium sulfide product, it is desirable to use a minimum amount of water to wash out the residual reaction product.

The oxidic materials of calcium and/or strontium as used herein are oxides or compounds which break down to form oxides when heated at temperatures up to about 800° C. Some examples of oxidic materials are oxides, carbonates, or oxalates of calcium and strontium. Combinations of two or more oxidic materials may be used.

The sulfurizing flux is a flux which yields alkali sulfides and polysulfides upon heating and is molten in the 800° to 1200° C. temperature range. The sulfurizing flux may be a mixture of sulfur and either sodium carbonate, potassium carbonate, or their combinations. Up to 50 mol % of sodium carbonate and/or potassium carbonate may be substituted by lithium carbonate. Sodium thiosulfate and/or potassium thiosulfate may also be used for this purpose. Combinations of lithium and potassium compounds are preferred.

A source of activator cations is included in the mixture when a phosphor or luminescent material is desired. Any cations known to be activators for calcium or strontium sulfide may be used. Activator cations may be introduced, for example, as sulfates, nitrates, halides, carbonates, acetates, oxides, or sulfides of the desired activator element.

The starting constituents are intimately mixed, for example, by ball milling. For uniform mixing of an extremely small amount of activator, slurry mixing may be applied. Then, the mixture is placed in a covered crucible such as made of alumina. If high temperature and long heating are used, it is preferred to put the crucible in a larger alumina crucible, and the space between the two crucibles is filled with charcoal to avoid oxidation of the reactants and product. The crucible with its contents is then placed in a furnace which is heated to about 800° to 1200° C. for about 0.2 to 72 hours, and is then cooled to room temperature. Generally, the higher the temperature, the shorter the required heating time. During the heating, alkali sulfides and polysulfides are released in the mixture which react with the oxidic materials forming the desired sulfides. Also, the sulfurizing flux melts and dissolves substantially all of the calcium and/or strontium compounds and sources of activator cations that are present. During the cooling step, particles of the desired sulfide crystallize in the molten mass, which then solidifies.

The next step involves dissolving away the residual fluxes and residual reaction products with water, while recovering the calcium sulfide particles. The particles prepared by the novel method are relatively stable and insoluble in contact with water. Therefore, the water washing does not deteriorate the calcium sulfide product in any appreciable amount. On the other hand, since strontium sulfide materials that are prepared by the novel method are somewhat more soluble, water contact with these materials should be minimized. After water washing, the strontium-sulfide products are rinsed by an organic solvent; for example, ethyl alcohol, and then dried at about 100° C.

The calcium sulfide product prepared by the novel sulfurizing-flux method consists of well-crystallized, independent particles. The particle size ranges from a few microns to a submillimeter size depending upon the reaction temperature and time. The higher the temperature and the longer the time, the larger the particle size. The good crystallinity and the large particle size seem to increase the water stability; that is, reduce the rate of solubility in water. The lower rate of solubility permits the sulfurizing flux method to be used to prepare calcium sulfide. Ordinarily, the resulting calcium sulfide is dissolved away in the step of water washing away of the residual fluxes.

The novel method may also be used to prepare a variety of phosphors by incorporating various activators in a calcium and/or strontium sulfide host. For example, the calcium sulfide activated with cerium is an efficient green-emitting phosphor for ultraviolet and cathode-ray excitation. The luminescence efficiency is comparable with phosphors prepared by other known methods. If strontium is used to replace part of the calcium, the emission peak shifts to shorter wavelengths, and the strontium sulfide activated with cerium luminesces with a bluish green color. If the calcium sulfide is activated with europium, the phosphor luminesces with a deep red color.

EXAMPLE 1

Fifteen g (grams) of $CaCO_3$, 15.9 g of $Na_2CO_3$ and 14.4 g of sulfur are mixed by ball milling. The mixture is heated in a covered alumina crucible at 1000° C. for 4 hours; then the reaction product is cooled to room temperature. The product is crushed to a fine powder and then washed three times with a large quantity of deionized water. After rinsing with ethyl alcohol, the product is dried at 100° C. The product is a slightly discolored white powder which is CaS as evidenced by chemical and x-ray analysis. It has the NaCl type of structure with the cell parameter a=5.696 A.

EXAMPLE 2

Follow the procedure described in Example 1 except add 20.7 g of $K_2CO_3$ instead of $Na_2CO_3$. The product is CaS, a slightly discolored white powder.

EXAMPLE 3

Follow the procedure described in Example 1 except start with 3.3 g of $CaCO_3$ and 20.7 g of $Na_2S_2O_3.5H_2O$. The product is CaS, a slightly discolored white powder.

EXAMPLE 4

Dissolve 178 mg (milligrams) of $Ce_2(SO_4)_3.8H_2O$ in about 50 ml (milliliters) of deionized water. To this solution, add 50 g of $CaCO_3$ and mix to form a uniform slurry. The slurry is dried overnight at 110° C. After drying, it is ball milled to a fine powder, and 15 g of this fine powder is mixed with 15.9 g of $Na_2CO_3$ and 14.4 g of sulfur. The mixture is heated in a covered alumina crucible at 1000° C. for 4 hours, then the product is cooled to room temperature. The product is crushed, washed, rinsed and dried as described in Example 1. The product is a powder having a light green body color with the approximate empirical formula CaS:$Ce_{0.001}$. The product is both photoluminescent and cathodoluminescent with a visual green emission color. The emission spectrum is a broad band consisting of two overlapping bands, a principal peak at 507 nm (nanometers) and a minor peak at 565 nm. The phosphor has a luminescence efficiency comparable to those prepared by the other methods.

EXAMPLE 5

Follow the procedure described in Example 4 except heat at a different temperature between 900° and 1100° C. for a time duration between 4 and 72 hours. For 72 hours of heating at 900°, 1000°, and 1100° C., the crucible is placed in a large alumina crucible, and the space between the two crucibles is filled with charcoal to avoid oxidation of the reactant and the product. The products have characteristics described in Example 4. The particle size varies with heating temperature and time. The higher the reaction temperature and the longer the reaction time, the larger the particle size. TABLE 1 below gives the approximate particle size obtained at different heating conditions. All the particles appear as smooth, well-formed and non-aggregated single crystals of polyhedral shape with rounded edges.

TABLE 1

| Reaction Temperature (°C.) | Reaction Time (hr.) | Maximum Size ($\mu m$) | Average Size ($\mu m$) |
| --- | --- | --- | --- |
| 900 | 4 | 9 | 5 |
| 900 | 72 | 33 | 22 |
| 1000 | 4 | 18 | 10 |
| 1000 | 72 | 72 | 49 |
| 1100 | 4 | 31 | 22 |
| 1100 | 72 | 104 | 72 |

The rate of dissolution into water depends upon the various factors such as quantity of water, degree of agitation, and temperature. To measure the rate of dissolution, the phosphors are immersed in water with constant stirring for a given length of time at room temperature, rinsed with ethyl alcohol, and then dried. The weight loss, for example, for a slurry containing 33 weight percent of phosphor is less than one percent after 6 days' immersion for all phosphors listed above. The weight loss increases when the slurry is diluted, the weight loss being smaller for the larger particles. The cathodoluminescence of each of these phosphors is not much deteriorated by water immersion. On the average, only a few percent drop in efficiency is observed.

EXAMPLE 6

Follow the procedure described in Example 4 except use different amounts of $Ce_2(SO_4)_3.8H_2O$ between 44.5 and 267.2 mg. The products are powders of CaS containing 0.025 to 0.15 mole percent of cerium. With increasing cerium content, the body color changes from light brown to light yellowish green, and the emission color changes from yellowish green ($x \times 0.285$, $y=0.559$) to a more yellowish green ($x=0.302$, $y=0.578$).

EXAMPLE 7

Follow the procedure described in Example 3 except add different amounts of $Ce_2(SO_4)_3.8H_2O$ to the starting mixture, the cerium content in CaS being between 0.01 and 1.0 mole percent. The products are both photoluminescent and cathodoluminescent. The luminescence efficiency depends upon the cerium content. Efficient emission is observed for the phosphors containing 0.1 to 0.25 mole percent of cerium.

EXAMPLE 8

Follow the procedure described in Example 4 except use $CeCl_3.7H_2O$, $Ce(NO_3)_3.5H_2O$, or $Ce_2S_3$ in place of $Ce_2(SO_4)_3.8H_2O$. The products are both photoluminescent and cathodoluminescent, and have the same characteristics described in Example 4.

EXAMPLE 9

Follow the procedure described in Example 3 except add either $Eu_2O_3$, $Eu_2S_3$, or $EuCl_3.6H_2O$, the amount of europium being between 0.004 and 0.1 mole percent in CaS. The products are both photoluminescent and cathodoluminescent with a visual deep red emission color ($x=0.682$, $y=0.314$). The emission band has a peak at 652 nm. Efficient emission is observed for phosphors containing about 0.04 mole percent of europium.

EXAMPLE 10

Follow the procedure described in Example 4 except replace part or all of the $CaCO_3$ with $SrCO_3$ in an increasing amount in steps of 20 mole percent of $CaCO_3$, and heat at 1100° C. for 4 hours. The products are powders of $Ca_{1-x}Sr_xS:Ce_{0.001}$ (wherein $x=0$ to 1). With increasing strontium content, the body color changes from light yellowish green to light bluish green, and the emission color changes from yellowish green to bluish green. The shapes of the emission spectrum are similar to that of CaS:Ce as described in Example 4, except that the location of the emission bands shifts toward shorter wavelengths as the strontium content increases. The lattice parameter increases linearly with strontium content. TABLE II below gives the lattice constant, the peak position of the main emission band and the x,y-coordinates of the cathodoluminescence.

TABLE II

| Composition | Lattice Constant (A) | Emission Peak (nm) | x | y |
| --- | --- | --- | --- | --- |
| $CaS:Ce_{0.001}$ | 5.696 | 508 | 0.317 | 0.579 |
| $Ca_{0.8}Sr_{0.2}S:Ce_{0.001}$ | 5.754 | 504 | 0.299 | 0.566 |
| $Ca_{0.6}Sr_{0.4}S:Ce_{0.001}$ | 5.822 | 501 | 0.279 | 0.551 |
| $Ca_{0.4}Sr_{0.6}S:Ce_{0.001}$ | 5.887 | 494 | 0.249 | 0.522 |
| $Ca_{0.2}Sr_{0.8}S:Ce_{0.001}$ | 5.956 | 488 | 0.217 | 0.477 |
| $SrS:Ce_{0.001}$ | 6.018 | 483 | 0.198 | 0.435 |

EXAMPLE 11

Dissolve 178 mg of $Ce_2(SO_4)_3.8H_2O$ in about 50 ml of deionized water. To this solution, add 50 g of $CaCO_3$ and mix to form a uniform slurry. The slurry is dried overnight at 110° C. After drying, it is ball milled to a fine powder. The fine powder is mixed with 48.4 g of $K_2CO_3$, 11.1 g of $Li_2SO_3$, and 64.1 g of sulfur. The mixture is heated at 1100° C. for 4 hours using the double-crucible technique described in Example 5. After cooling to room temperature, the product is crushed, washed, rinsed, and dried as described in Example 1. The product is a powder having yellowish body color with the approximate empirical formula $CaS:Ce_{0.001}$. The product has the same luminescence characteristics as the product described in Example 4.

What is claimed is:

1. A method for preparing an inorganic sulfide material consisting essentially of
    (a) heating at temperatures between about 800° and 1200° C. a mixture consisting essentially of (i) at least one member of the group consisting of oxidic materials of calcium, strontium and combinations thereof and (ii) a reactive sulfurizing flux which yields alkali metal sulfides and polysulfides upon heating and which is molten between about 800° and 1200° C. and consists essentially of (I) sulfur in elemental form, or as a sulfide of an alkali metal, or a thiosulfate of an alkali metal, and (II) at least one alkali metal as a compound thereof, said compound being thiosulfate, or a carbonate or a hydroxide, said at least one alkali metal being a member selected from the group consisting of sodium, potassium and combinations of at least two of sodium, potassium and lithium, said heating being continued until said flux melts, reacts with said oxidic material and the mixture forms into a molten mass, (b) cooling said mass to about room temperature whereby relatively water-insoluble particles of said inorganic sulfide material crystallize in a relatively water-soluble matrix, (c) dissolving said matrix with water and (d) collecting particles of said inorganic sulfide material.

2. The method defined in claim 1 wherein said at least one alkali metal consists of up to about 50 mol percent lithium and the balance at least one of sodium and potassium.

3. The method defined in claim 1 wherein said reactive flux consists essentially of sodium thiosulfate.

4. The method defined in claim 1 wherein said reactive flux consists essentially of sulfur and sodium carbonate.

5. The method defined in claim 1 wherein said group of oxidic materials consists essentially of oxides and compounds which decompose to oxides upon heating at temperatures up to 800° C.

6. The method defined in claim 1 wherein said oxidic material consists substantially entirely of calcium oxide.

7. The method defined in claim 1 wherein said mixture includes also (iii) a source of activator cations for said sulfide material, and at least some of said activator cations are incorporated into said sulfide material to render said sulfide material luminescent.

8. The method defined in claim 7 wherein said activator cations are cerium cations.

9. The method defined in claim 7 wherein said activator cations are europium cations.

* * * * *